United States Patent
Limmack et al.

(10) Patent No.: US 8,854,787 B2
(45) Date of Patent: Oct. 7, 2014

(54) BOND LEAD

(75) Inventors: Andrew Paul Limmack, Bristol (GB);
David Alistair Sutton, Bristol (GB);
Colin John West, Pontypridd (GB)

(73) Assignee: Airbus Operations Limited, Bristol (GB)

( * ) Notice: Subject to any disclaimer, the term of this patent is extended or adjusted under 35 U.S.C. 154(b) by 180 days.

(21) Appl. No.: 13/212,473

(22) Filed: Aug. 18, 2011

(65) Prior Publication Data
US 2012/0043415 A1  Feb. 23, 2012

(30) Foreign Application Priority Data

Aug. 20, 2010  (GB) .................................. 1013939.2

(51) Int. Cl.
*H05F 3/00* (2006.01)
*B64D 37/32* (2006.01)
*H01B 1/24* (2006.01)
*F16L 27/12* (2006.01)
*F16L 25/01* (2006.01)
*F16L 27/02* (2006.01)

(52) U.S. Cl.
CPC .................. *F16L 27/12* (2013.01); *B64D 37/32* (2013.01); *H01B 1/24* (2013.01); *F16L 25/01* (2013.01); *F16L 27/026* (2013.01)
USPC ........................................................ 361/218

(58) Field of Classification Search
USPC ............ 174/117 FF; 428/375, 379, 383, 392, 428/394, 395; 361/220, 212, 218; 977/773
See application file for complete search history.

(56) References Cited

U.S. PATENT DOCUMENTS

| | | | | |
|---|---|---|---|---|
| 4,175,812 A | * | 11/1979 | Palmer | 439/502 |
| 4,502,092 A | * | 2/1985 | Bannink et al. | 361/218 |
| 5,321,071 A | * | 6/1994 | Fujisawa et al. | 524/496 |
| 5,571,859 A | * | 11/1996 | Yukishige et al. | 524/496 |

(Continued)

FOREIGN PATENT DOCUMENTS

| | | |
|---|---|---|
| DE | 102005048190 | 4/2007 |
| EP | 1981035 | 10/2008 |

(Continued)

OTHER PUBLICATIONS

Siddiqui, Naveed A, et al. "Self-healing Glass Fibres with Carbon Nanotube-Epoxy Nanocomposite Coating", Key Engineering Materials vols. 334-335 (2007), pp. 805-808.

(Continued)

*Primary Examiner* — Jenny Wagner
*Assistant Examiner* — Pete Lee
(74) *Attorney, Agent, or Firm* — Lowe Hauptman & Ham, LLP

(57) ABSTRACT

A bonding lead comprising a core; and a sheath bonded to the core. The core comprises a substrate of fibers coated with nano-objects with at least one dimension between 1 nm and 200 nm. The nano-objects form a continuous electrically conductive network from one end of the bonding lead to the other with some of the nano-objects coating the fibers and others forming bridges between adjacent fibers. The nano-objects may be carbon nanotubes and the core may be woven or knitted. A conductive connector is provided at each end of the bonding lead, for instance a tab formed from an electrically conductive polymer. The lead can be used to dissipate static charge and/or lightning current between components, typically within an aircraft fuel tank.

28 Claims, 8 Drawing Sheets

(56) References Cited

U.S. PATENT DOCUMENTS

| | | | |
|---|---|---|---|
| 8,038,479 B2 * | 10/2011 | Searfass | 439/658 |
| 2003/0040215 A1 * | 2/2003 | Kleen | 439/510 |
| 2005/0170177 A1 * | 8/2005 | Crawford et al. | 428/375 |
| 2008/0213560 A1 * | 9/2008 | Moireau et al. | 428/222 |
| 2008/0241695 A1 | 10/2008 | Song et al. | |
| 2010/0019209 A1 | 1/2010 | Meng et al. | |
| 2010/0044647 A1 | 2/2010 | Meng et al. | |
| 2010/0144205 A1 | 6/2010 | Searfass | |
| 2010/0159240 A1 * | 6/2010 | Shah et al. | 428/368 |
| 2010/0310851 A1 * | 12/2010 | Lai et al. | 428/300.1 |

FOREIGN PATENT DOCUMENTS

| | | |
|---|---|---|
| JP | 2005105015 | 4/2005 |
| KR | 100829001 | 5/2008 |
| KR | 20090126722 | 12/2009 |
| WO | 02076724 | 10/2002 |
| WO | 2005114324 | 12/2005 |
| WO | 2005119772 | 12/2005 |
| WO | 2008002317 | 1/2008 |
| WO | 2008048705 | 4/2008 |
| WO | 2008-085550 A2 | 7/2008 |
| WO | 2010-117475 A1 | 10/2010 |
| WO | 2010-135335 A1 | 11/2010 |

OTHER PUBLICATIONS

Gao, S.L. et al. "Nanostructured coatings of glass fibers: Improvement of alkali resistance and mechanical properties" Science Direct Acta Materialia 55 (2007) pp. 1043-1052.

Sandler, J. et al. "Development of a dispersion process for carbon nanotubes in an epoxy matrix and the resulting electrical properties" Polymer Communication, Polymer 40 (1999) pp. 5967-5971.

Sureeyatanapas, P. et al. "Nanotube Composite Coating as Strain Sensors on Glass Fibres in Epoxy Composites" 13th European Conference on Composite Materials, Jun. 2, 2008, http://extra.ivf.se/eccm13_programme/abstracts/807.pdf.

Extended European Search Report for Application No. 11177675.3 mailed Dec. 19, 2011.

British Search Report for 1013939.2 dated Dec. 23, 2010.

Paweena Sureeyatanapas and Robed J. Young, "SWNT composite coatings as a strain sensor on glass fibres in model epoxy composites," Composites Science and Technology 69, 2009, pp. 1547-1552.

* cited by examiner

BOND LEAD

RELATED APPLICATIONS

The present application is based on, and claims priority from, British Application Number 1013939.2, filed Aug. 20, 2010, the disclosure of which is hereby incorporated by reference herein in its entirety.

FIELD OF THE INVENTION

The present invention relates to a bonding lead, a method of manufacturing a bonding lead, and a method of using a bonding lead to prevent sparking across a joint on an aircraft.

BACKGROUND OF THE INVENTION

There is a risk in aircraft fuel systems of a build up of static electricity on one component in comparison to another component to which it is connected. In the prior art, a so-called bonding lead is connected to each side of the joint in order to electrically connect the components and prevent static build up. An example of such a bonding lead is described in the prior art section of US2008/0078880.

Bonding leads are traditionally made of highly conductive materials in different forms. These satisfy equipotential and electrostatic discharge requirements but allow the flow of lightning current across the joint. There is a risk that a break in such a bonding lead can result in intermittent contact with structure surrounding the bonding lead and a source of sparking should high levels of electricity flow in the lead, for instance during a lightning strike.

SUMMARY OF THE INVENTION

A first aspect of the invention provides a bonding lead comprising a core; a sheath bonded to the core; and a conductive connector at each end of the bonding lead, wherein the core comprises a substrate of fibres coated with nano-objects with at least one dimension between 1 nm and 200 nm, wherein the nano-objects form a continuous electrically conductive network from one end of the bonding lead to the other with some of the nano-objects coating the fibres and others forming bridges between adjacent fibres.

The resistance of the bonding lead can be tailored easily and predictably by forming either a relatively sparse/thin or a relatively dense/thick network of nano-objects. The nanometer scale of the network means that it is able to articulate with the fibres without any detrimental effect on performance.

The fibres may be coated by applying the nano-objects to the fibres as a liquid dispersion (for instance by spraying the dispersion onto the fibres or dipping the fibres into the dispersion) and allowing the dispersion medium to evaporate. This enables the thickness and density of the network (and hence the resistance of the bonding lead) to be controlled easily by adjusting the concentration of nano-objects in the dispersion. The liquid dispersion may be for example a solution (in which the nano-objects are dissolved in a solvent), a suspension, a colloid or a sol.

Preferably the fibres are formed from a material such as glass with a high resistivity, typically above $10^6$ $\Omega$m and most preferably above $10^8$ $\Omega$m.

The fibres may be uni-directional, running along the length of the bonding lead only. However more preferably the fibres are crossed with each other. The fibres may be crossed with each other by weaving, knitting, twisting or braiding; or the crossed fibres may occupy adjacent layers which are not interlocked with each other (other than by the nano-objects), one layer having uni-directional fibres running along the length of the bonding lead and the other layer having uni-directional fibres running transverse to the length of the bonding lead. A crossed fibre structure is preferable since it enables the nano-objects to form bridges at the points where the fibres cross with each other. Also, a crossed fibre structure provides a larger number of electrical paths along the bonding lead than a unidirectional fibre structure, since at least part of at least some of the fibres run at an angle to the length of the bonding lead.

Preferably the fibres are interlocked with each other, for instance by weaving, knitting, braiding or twisting. This provides a robust and interconnected structure for the fibres Preferably at least some of the fibres are continuous fibres which run continuously between the conductive connectors. These continuous fibres may run along the bonding lead parallel with its length; or they may follow helical, zig-zag or otherwise undulating paths. Typically the length of the continuous fibres is significantly greater than the length of the nano-objects, with the ratio being greater than 10 and more typically greater than 100.

Typically the fibres are coated with a surface activation material such as silane. This can enable the fibres to be coated more easily, for instance by making the liquid dispersion wet the fibres thoroughly during the coating step or by forming a covalent bond with the nano-objects.

The nano-objects may in turn be functionalized to either react with the fibres or a surface activation material coating that has been applied to them. For instance the nano-objects may be functionalized by a carboxyl group (COOH) which reacts with a silane coating on the fibres.

The sheath may be bonded to the core by applying a low viscosity material to the core (for instance by dipping, moulding or calendaring) so that the sheath fully impregnates the core. This has the advantage of minimising chafing between the fibres but may suffer from the problem that the sheath material disrupts the network of nano-objects which can affect its conductivity. Therefore the sheath material may alternatively be applied in a high viscosity/high tack state by moulding or calendaring so that the sheath does not fully impregnate the core and the interior of the core has voids which are not filled with sheath material.

The sheath may be fibre-reinforced, providing mechanical strength to the bonding lead. In a preferred embodiment, the sheath is bonded to the core by at least partially impregnating a fibre substrate with a matrix; and curing the matrix in contact with the core. This co-bonding method prevents the matrix from fully impregnating the core.

Preferably the nano-objects are elongate tubes or fibres with an aspect ratio greater than 10, and preferably greater than 100. In the case of carbon nano-fibres or carbon nano-tubes the aspect ratio can be significantly higher than 100. The use of high aspect ratio nano-objects enables them to articulate easily without breaking as the bonding lead bends. It also enables the nano-objects to form a highly tangled network which is physically robust and provides many conductive paths from one end of the lead to the other.

Preferably the nano-objects have at least one dimension between 1 nm and 100 nm.

The nano-objects may be formed from silicon carbide but more typically the nano-objects are carbon nano-objects such as carbon nanotubes or carbon nanofibres. Multi-walled carbon nanotubes are preferred since they are less susceptible to damage (for example from acid or ultrasound) than single-walled carbon nanotubes, as well as being cheaper and easier to disperse.

A conductive connector is provided at each end of the bonding lead. The conductive connector typically comprises a piece of conductive material which engages the core and/or the sheath. The connector may be a crimped metal ferrule, or a tab formed from an electrically conductive polymer which may be thermoplastic or thermoset. The tab could be moulded onto the core, for example by compression moulding, injection moulding, or a lamination process. The conductive polymer invasively penetrates the substrate over a large area and provides a good mechanical interface for load transfer into the substrate. The use of a conductive polymer also means that the bonding lead can be attached to a component via the tab to some kind of moulded fitting instead of a bolted joint. This can be beneficial for quick assembly, reducing part count and allowing the designer to decide the angle that the bonding lead is attached to the component and not the installer who could angle a bolted bonding lead inappropriately, leading to fretting on another part or restricting some movement.

A further benefit in the use of a polymer tab is that it gives greater freedom in terms of the cross-sectional shape of the bonding lead, so the design is not restricted to flat tapes. For example, woven tubular substrates can be used for the core resulting in a bonding lead that is circular in cross section and more suited to locations where the bonding lead is openly exposed to fluid flows.

Optionally the sheath may comprise a polymer loaded with a conductive filler. The conductive filler may be carbon, preferably in the form of carbon black, graphite, graphene, or carbon nanotubes. The use of a conductive sheath enables the connector to be attached to the sheath (for instance by being crimped or moulded onto the sheath) with the sheath providing an electrically conductive path to the core. Also, the sheath can then provide a path for electrical conduction in parallel with the core, thus providing a further element of redundancy to the bonding lead, although the conductivity of the core will need to be reduced accordingly.

Typically the bonding lead has an electrical resistance between its two ends which is greater than 100 kΩ and preferably greater than 200 kΩ. Typically the bonding lead has an electrical resistance between its two ends which is less than 10 MΩ and preferably less than 1 MΩ.

A further aspect of the invention provides a method of manufacturing the bonding lead of the first aspect of the invention, the method comprising forming the core of the bonding lead by coating a substrate of fibres with nano-objects with at least one dimension between 1 nm and 200 nm so that the carbon nano-objects form a continuous electrically conductive network from one end of the bonding lead to the other, with some of the nano-objects coating the fibres and others forming bridges between adjacent fibres; bonding a sheath to the core; and attaching a conductive connector to each end of the bonding lead.

A further aspect of the invention provides a joint comprising: a first component; a second component joined to the first component; and a bonding lead according to the first aspect of the invention which forms an electrical connection between the components.

A further aspect of the invention provides a method of preventing sparking across a joint on an aircraft, the method comprising: electrically connecting components of the joint with each other with a bonding lead according to the first aspect of the invention; dissipating static charge between the components by means of the bonding lead; and passing lightning current between the components by means of the bonding lead.

The joint may be part of a fuel tank and/or part of an aircraft. One or both of the components in the joint may be a fuel pipe, a hydraulic pipe, an air pipe, a wall of a fuel tank, an access panel in a wall of a fuel tank, or any other part of an aircraft which is in contact with fuel when in use (in liquid or vapour form) or has the potential of doing so.

BRIEF DESCRIPTION OF THE DRAWINGS

Embodiments of the invention will now be described with reference to the accompanying drawings, in which.

DETAILED DESCRIPTION OF EMBODIMENTS

Figure 1:
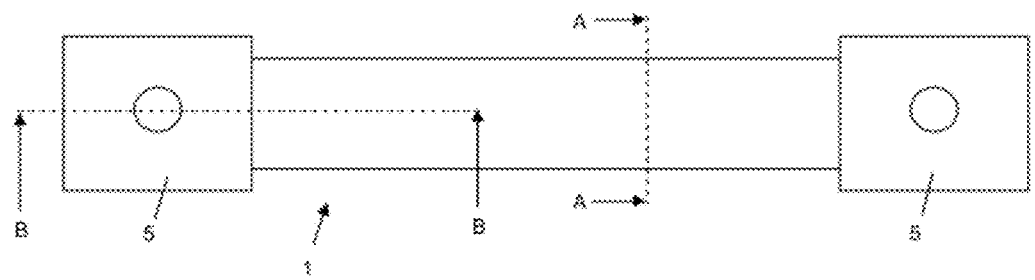
FIG. 1 shows a bonding lead according to a first embodiment of the invention.
Figure 2:
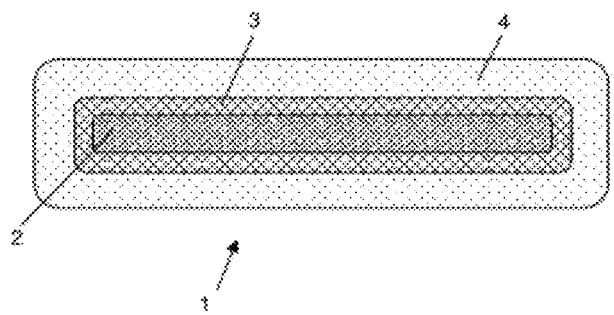
FIG. 2 is a sectional view taken along a line A-A.
Figure 3:
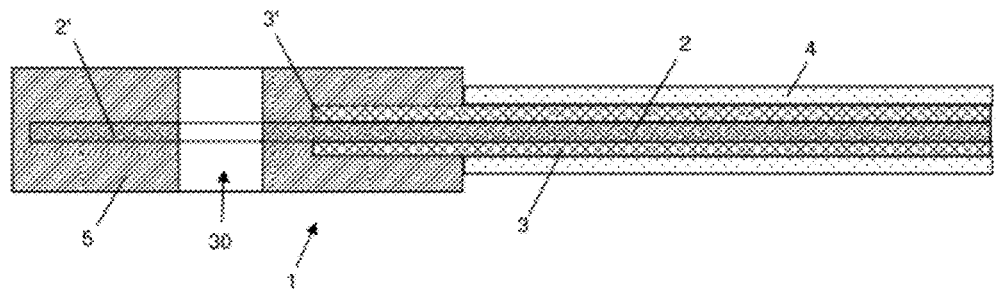
FIG. 3 is a sectional view taken along a line B-B.

FIGS. 1-3 show an elongate bonding lead 1 comprising a core 2; a silicone impregnated woven glass fibre inner sheath 3 for carrying mechanical loads; and a flexible fuel resistant outer sheath 4. The inner sheath 3 is terminated at 3' and an exposed end 2' of the core 2 extends beyond the termination point 3'. A conductive polymer end tab 5 is moulded to the exposed end 2' of the core and to a small length of the inner sheath 3.

The core 2 comprises a substrate coated with carbon nanotubes which form a continuous electrically conductive network from one end of the bonding lead to the other. The substrate material is chosen for its mechanical properties, and also as the backbone for the network formation. Preferably the substrate is a 0/90 degree woven glass fibre tape with a finished edge to prevent fraying.

Glass is selected as the fibre material because it is widely used in the aerospace industry, non-conducting, easily functionalised with sizing compounds and has a good strength/weight ratio while staying flexible.

In a first step the glass fibre is silane treated by the following process:

1. Dow Corning's Z-6011 gamma-Aminopropyltriethoxysilane is hydrolysed in double deionised water at 0.5% concentration, adding the Z-6011 to the water during magnetic stirring. 1M Acetic acid is then used to lower the pH to 4 through monitoring with an electronic meter while the acid is added as the solution is magnetically stirred.

2. A strip of woven plain glass fibre is immersed and agitated in the silane solution.

3. The strip is dried at 120° C. for 1.5 hours

The silane acts as a coupling agent to enhance bonding for the carbon nanotubes.

In a second step, a multi-walled nanotubes dispersion is provided as follows:

1. 8-15 nm MWNTs with —COOH functionalisation are obtained from Cheap Tubes Inc. (USA). The MWNTs are supplied as a dry powder.

2. An initial "master batch" of 0.3 wt % solution in isopropyl alcohol (IPA) is prepared using polyvinylpyrrolidone (PVP) dispersant at 0.3 g per 1.0 g MWNT.

3. The solution is placed in a flask of ice water. The use of an ice water bath during ultrasonication is necessary to prevent IPA loss through evaporation but also aids dispersion and stability as elevated solution temperatures are detrimental to keeping the MWNTs dispersed.

4. The MWNTs are dispersed by high powered ultrasonic dispersion using a Sonics and Materials VCX750 ultrasonic cell disrupter fitted with a 13 mm half wave extender. The amplitude of the 750 W unit is set to 100% and the pulse function is used with an interval of 5 seconds on and 20 seconds off. This pulse function helps limit heating and boiling of the solvent and also allows material to settle under the probe tip for more effective dispersion. Dispersion ensures that nanotubes are not in agglomerated lumps which cannot properly bond to the substrate to form a reliable network.

5. The dispersion is diluted to the required wt % using additional isopropyl alcohol.

6. Step 4 is repeated on the diluted dispersion in the ice bath.

In a third step, the silane treated glass fibre strip is placed in a bag with the MWNT dispersion. The bag is kept flat and not moved for 24 hours at normal room temperature, 20-25° C. The strip is then removed from the bag and suspended in a fume cabinet for another 24 hours. An elevated temperature may improve the bond strength.

The MWNT-IPA dispersion/solution needed to produce the correct network density was found to be around 0.1 wt %, i.e.: 0.1 g of MWNT to every 100 g of IPA solvent.

When working with typical lab quantities of 200 g solutions it is very difficult to maintain the accuracy of this solution due to the tiny amount of MWNTs meaning any loss from transferring between vessels and spattering losses during ultrasonication have a huge influence on the concentration. In addition to this, the low concentration solutions can actually be less effectively dispersed during ultrasonication as there are fewer particle-to-particle interactions and the viscosity of the solution can be low.

To get around this the best technique found was to produce the initial 'master batch' with a higher concentration of 0.3 wt % and then dilute the solution down as required. This has the added benefit of reducing processing time and increasing coherence between solutions with purposefully different concentrations.

Figure 4:
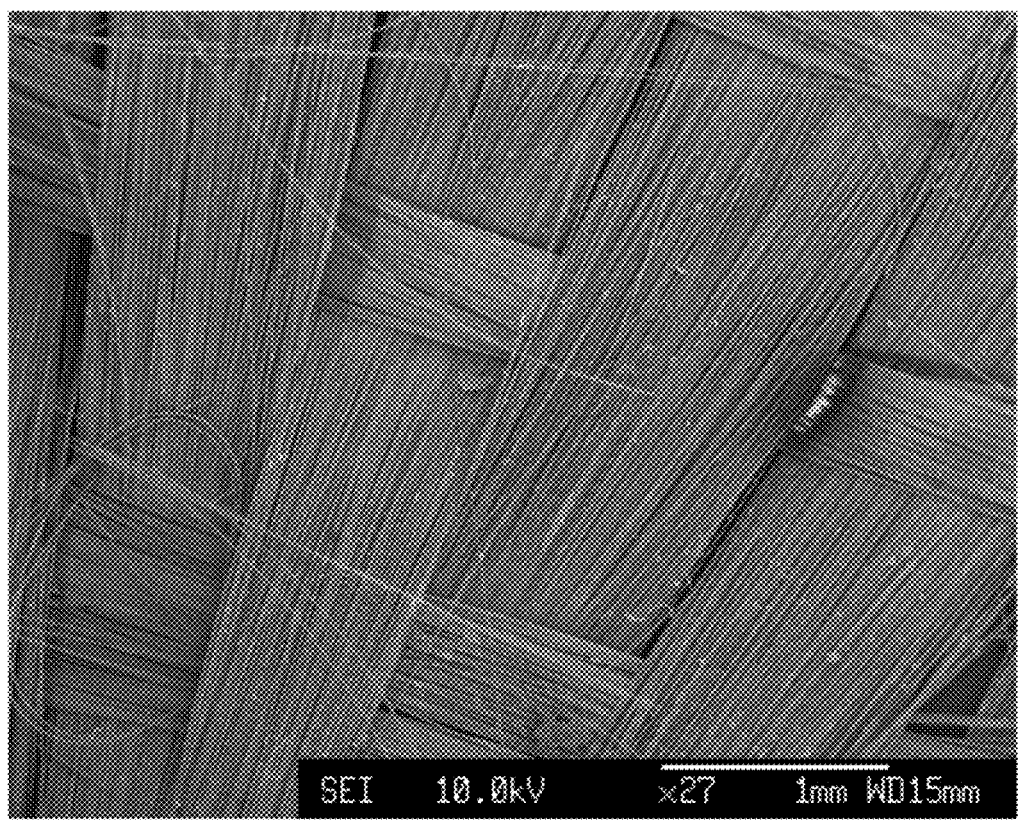
FIG. 4 is a Scanning Electron microscope (SEM) micrograph at ×27 magnification of a strip which has been placed in an MWNT dispersion at a concentration of 0.05 wt %.
Figure 5:
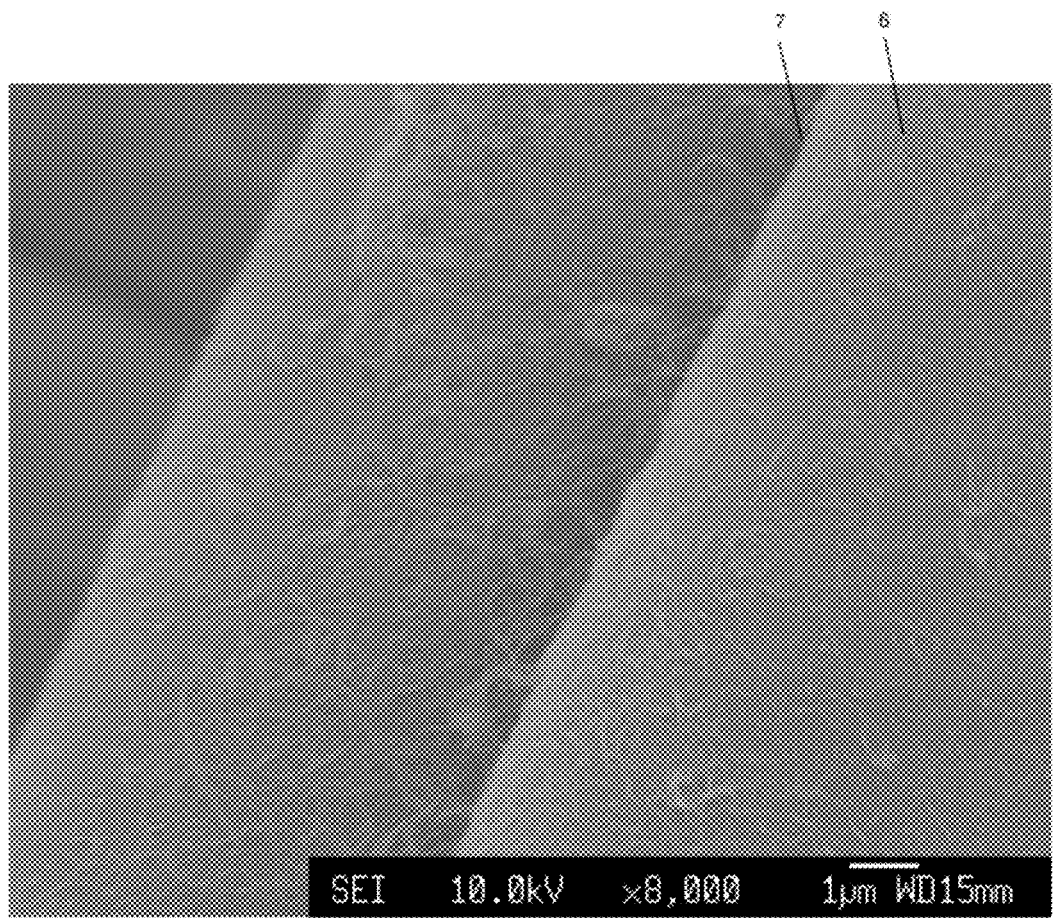
FIG. 5 is a Scanning Electron microscope (SEM) micrograph at ×8000 magnification of a strip which has been placed in an MWNT dispersion at a concentration of 0.05 wt %.

FIGS. 4 and 5 are Scanning Electron microscope (SEM) micrographs of a strip which has been placed in an MWNT dispersion at a concentration of 0.05 wt %. FIG. 4 shows the woven longitudinal 0° fibres which run along the length of the bonding lead, and the 90° fibres which run transverse to the length of the bonding lead. The fibres are coated with carbon nanotubes which are visible in FIG. 5. As can be seen in FIG. 5, some of the nanotubes 6 coat the fibres and others form bridges 7 between adjacent fibres. Thus the carbon nanotubes form a continuous electrically conductive network from one end of the strip to the other. Similar nanotube bridges also cross-link the 0° fibres and the 90° fibres at the points where they cross with each other.

Figure 6:
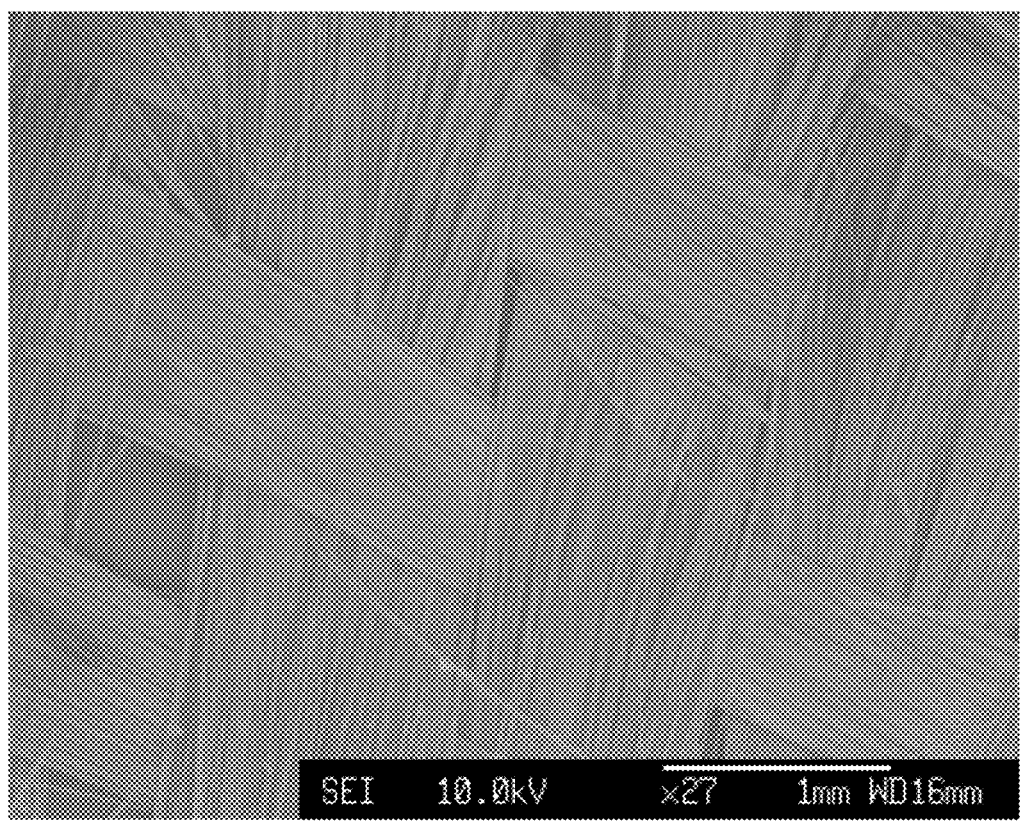
FIG. 6 is a Scanning Electron microscope (SEM) micrograph at ×27 magnification of a strip which has been placed in an MWNT dispersion at a concentration of 0.1 wt %.
Figure 7:
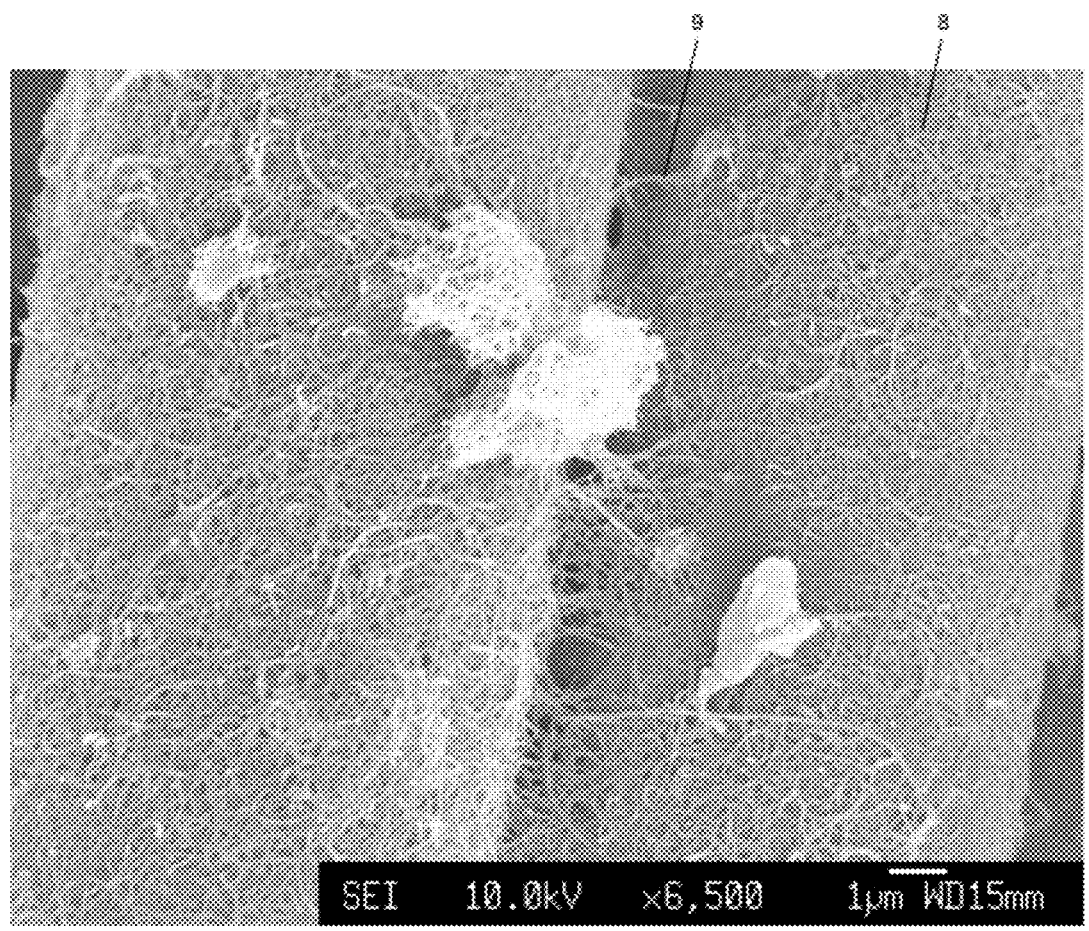
FIG. 7 is a Scanning Electron microscope (SEM) micrograph at ×6500 magnification of a strip which has been placed in an MWNT dispersion at a concentration of 0.1 wt %.

FIGS. 6 and 7 are Scanning Electron microscope (SEM) micrographs of a strip which has been placed in an MWNT dispersion at a concentration of 0.1 wt %. The fibres are coated with carbon nanotubes which are visible in FIG. 7. As in FIG. 5, some of the nanotubes 8 coat the fibres and others form bridges 9 between adjacent fibres. However it can be seen that the carbon nanotubes in FIG. 7 form a thicker and more dense network than the relatively thin/sparse network shown in FIG. 5.

The core 1 is encapsulated to protect the MWNT network and make the bonding lead 1 safe to handle. First the inner sheath 3 is formed by providing two strips of plain glass fibre tape (the same tape as used for the substrate of the core 2); impregnating each strip with a regular one part RTV silicone resin matrix and allowing it to reach a tacky stage; and applying the impregnated strips to either side of the core 2 with an exposed length of core 2' extending from each end 3'.

Optionally the matrix phase of the inner sheath 13 may be formed from a fluorosilicone elastomer loaded with a conductive filler. The conductive filler may be carbon nanotubes; chopped or milled carbon fibre; recycled milled carbon fibre; or various forms of graphite platelets. This builds in an element of redundancy to the bonding lead in that it gives the sheath 3 a degree of electrical conductivity as well as the core 2.

The conductive polymer end tab 5 is moulded to the exposed end 2' of the core and to a small length of the inner sheath 3 by the following process. The encapsulated core 2,3 is clamped in the centre die of a machined aluminium mould. Carbon black filled high density polyethylene (HDPE) supplied by Cabot Corporation as an injection moulded tablet is milled back into a fine powder. The mould is then loaded with a calculated mass of the conductive polymer powder on each side of the encapsulated core, and gently compressed without any heat to consolidate the powder before heater blocks are turned on and as the mould reaches the melting temperature, 180° C. for the HDPE used, the clamping pressure is increased until the mould is fully closed. The heaters are then turned off and the mould is allowed to cool to around 120° C. before removal of the clamping pressure and disassembly to reveal the moulded end tab as shown in FIG. 3. A hole 30 is then drilled through the tab 5.

It is likely that a conductive polyetheretherketone (PEEK) material will be more suitable as a material for the end tabs 5 but this would require a much higher processing temperature of around 400° C. which cannot be performed with an aluminium mould. At this temperature it is possible that the MWNTs could be oxidised and destroyed but in a closed mould this risk would be very low as it is normally experienced when MWNTs are heated to these temperatures in free air. The exposure time would also be very short.

The flat end tab 5 is used as an example for ease of moulding and the end tab can be moulded into any design, for example to be formed into some sort of connector.

Another possible material for the end tabs 5 is a fluorosilicone elastomer with a conductive filler.

After the end tabs 5 have been applied, then further protective material is applied to form the outer sheath 4. The outer sheath may be applied by any suitable method, for instance spraying, brushing or dipping. A suitable material is fluorosilicone elastomer.

The encapsulation process described above ensures that the silicone elastomer in the inner sheath 3 and the outer sheath 4 does not fully impregnate the core 2 so that the interior of the core 2 has voids which are not filled with sheath material. This prevents the elastomer from disrupting the conductive network formed by the carbon nanotubes.

Figure 8:
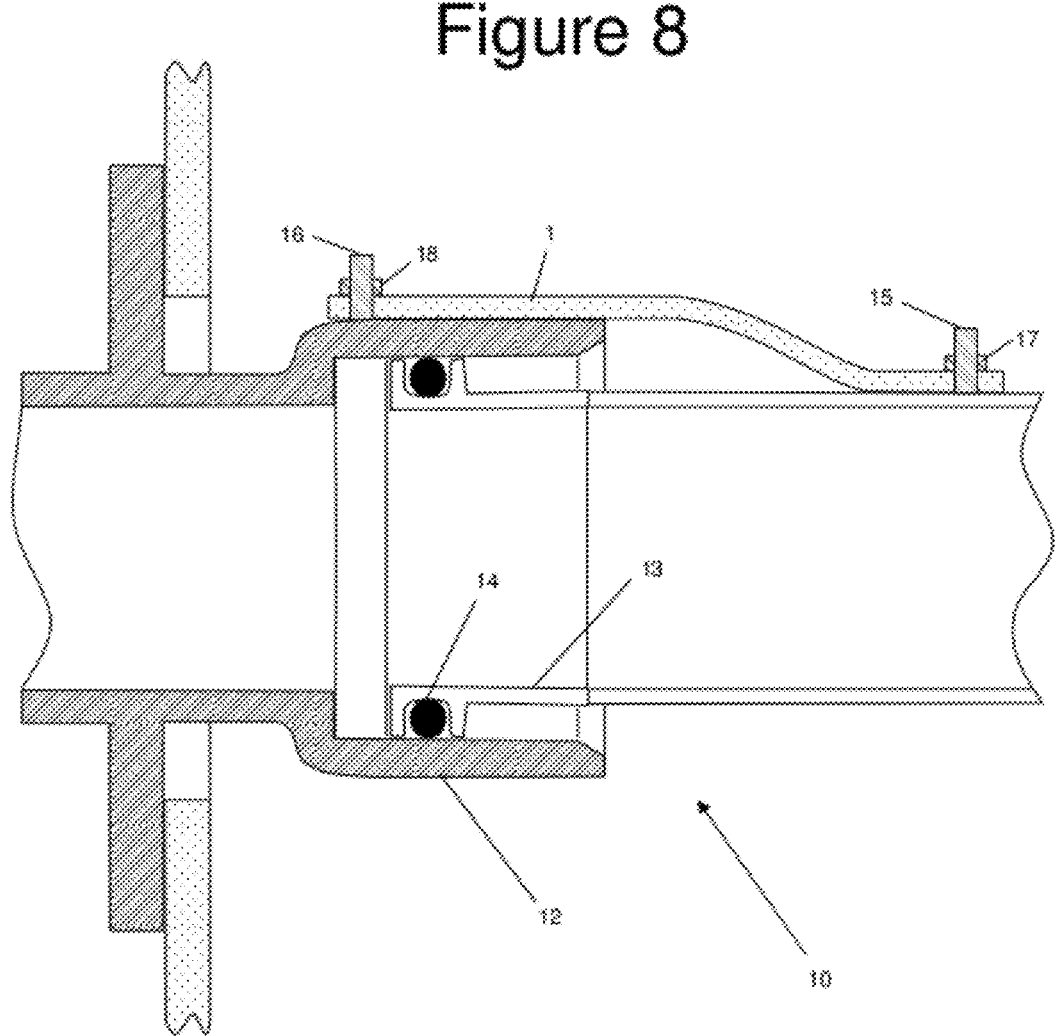
FIG. 8 is a sectional view of a joint according to an embodiment of the invention.

FIG. 8 shows an example of how the bonding lead 1 can be fitted to a fuel pipe joint 10 on an aircraft. The joint comprises a socket 12, in which a pipe end fitting 13 is located, an O-ring seal 14 sealing the contact between the socket and the pipe end fitting, and a threaded connection shaft 15 welded to the fuel pipe connected to the pipe end fitting 13. A further threaded connection shaft 16 is machined on the socket arrangement and the bonding lead 1 is arranged between the two connection shafts 15, 16 electrically connecting one side of the joint to the other. Nuts 17, 18 are fitted onto the connection shafts 15,16 to press the conductive polymer end tabs of the bonding lead against the fuel pipe and socket 12 respectively. The bonding lead 1 provides the path of least electrical resistance between the two components, the O-ring seal 14 being highly resistive. Thus the bonding lead 1 dissipates static charge and passes lightning current between the components 12, 13.

The flat cross section strap in FIG. 2 may not be ideal in fluid flow if the strap has a high aspect ratio of width to thickness, but the use of a densely woven network substrate material and high network density would mean narrower tapes could be used so when combined with the additional mechanical layers 3,4 the width to thickness ratio would be reduced. Flat tapes would also be useful for conforming to a structure, for example being bonded or clipped into place over stiffening webs inside a fuel tank. This would stop the strap moving with fuel flow, reducing mechanical loads and fatigue and reducing the risk of a strap being damaged by inspection personnel as it is no longer available as a hand hold.

Figure 9:
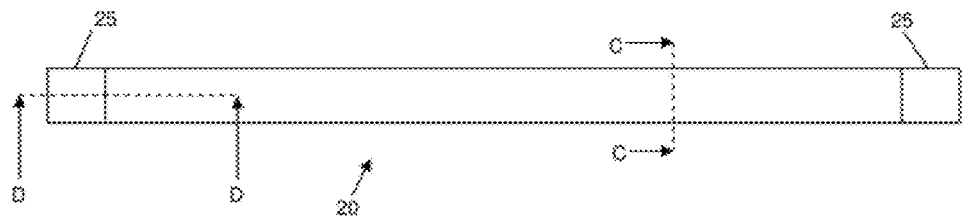
FIG. 9 shows a bonding lead according to a second embodiment of the invention.
Figure 10:
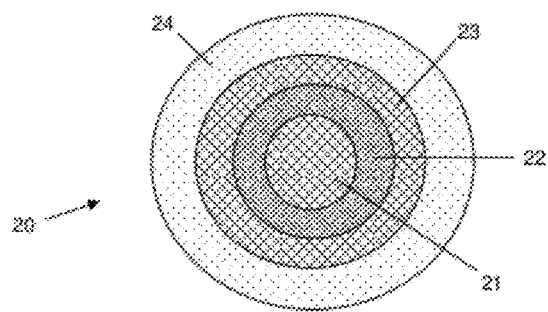
FIG. 10 is a sectional view taken along a line C-C.
Figure 11:
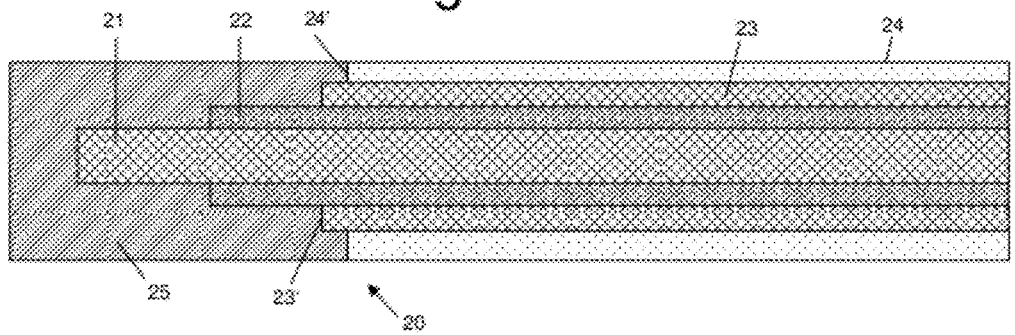
FIG. 11 is a sectional view taken along a line D-D.

FIGS. 9-11 show a cylindrical bonding lead 20 according to a second embodiment of the invention which can be used in the joint of FIG. 8 instead of the bonding lead 1. The lead has a central glass fibre core 21 which is non-conductive and provided to support mechanical loads; a conductive tube 22 which surrounds the core 20 and is formed of woven glass fibre coated with multi-wall carbon nanotubes (MWNTs) using the process described above; a non-conductive glass fibre inner sheath 23 which surrounds the conductive tube 22 and provides further mechanical support; and a flexible fuel resistant outer sheath 24. The inner sheath 23 and outer sheath 24 are terminated at 23', 24' respectively and an exposed end of the conductive tube 22 extends beyond the termination points 23,' 24'. A conductive polymer end tab 25 is moulded to the exposed end of the conductive tube 22 as shown in FIG. 11.

The round cross section of the bonding lead 20 is more of a direct like-for-like replacement of a metallic bonding lead. This design might be better where exposure to fluid flow is unavoidable and the moulded end fitting 25 could also be cylindrical or could be moulded rectangular or any other shape as required. The round cross section would undoubtedly be stiffer in all directions than a flat section so its route would be more likely to be point-to-point with some allowance of 'slack' but some spiraling may be needed if tight bend radii are not possible.

In a further embodiment of the invention (not shown), the core 2 in the embodiment of FIG. 1 may be encapsulated in a single sheath instead of two sheaths 3,4. The single sheath may be formed from fluorosilicone elastomer loaded with a conductive filler such as carbon black or carbon nanotubes. The elastomer is moulded or calendared onto the core 2 and fully impregnates the core 2 so as to prevent chafing between the fibres.

Figure 12:
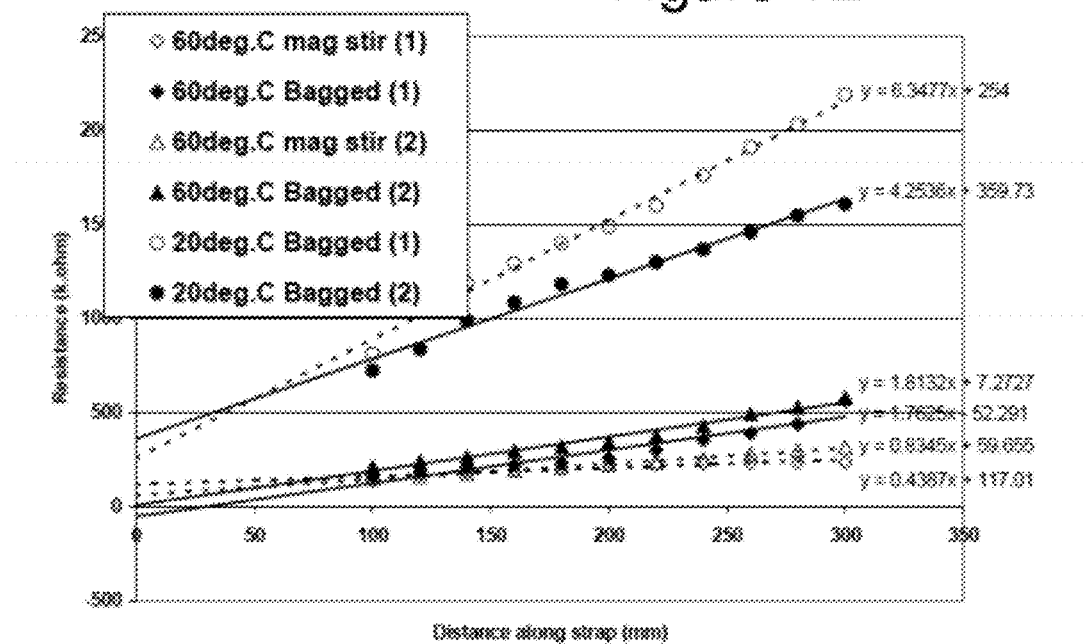
FIG. 12 is a graph showing the resistance of strips which have placed in an MWNT dispersion at a concentration of 0.05 wt %, at different temperatures (20° C. or 60° C.), and either placed in a static bag or in a magnetic stirrer.
Figure 13:
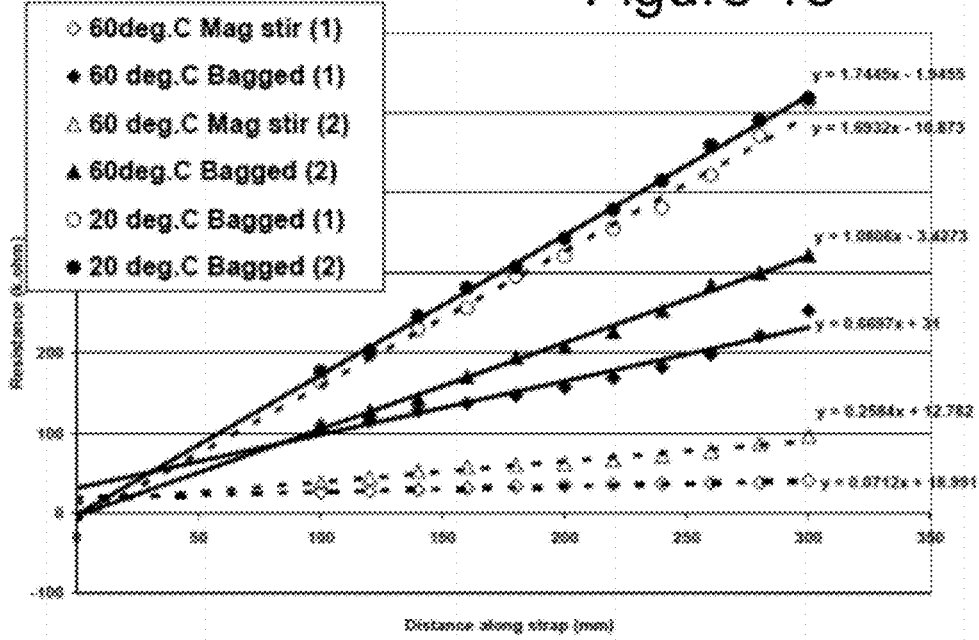
FIG. 13 is a graph showing the resistance of strips which have placed in an MWNT dispersion at a concentration of 0.1 wt % under otherwise similar process conditions.

The bonding leads described above are designed to form an electrical connection between the components of a joint with a relatively high electrical resistance—between 200 k$\Omega$ and 500 k$\Omega$. FIG. 12 is a graph showing the resistance of strips which have placed in an MWNT dispersion at a concentration of 0.05 wt %, at different temperatures (20° C. or 60° C.), and either placed in a static bag or in a magnetic stirrer. FIG. 13 is a graph showing the resistance of strips which have placed in an MWNT dispersion at a concentration of 0.1 wt % under otherwise similar process conditions.

The resistance of the strips which have been placed in an MWNT dispersion at a concentration of 0.05 wt % is significantly higher. For a strap length over 100 mm, the 0.05 wt % samples processed at 60° C. fall within the desired resistance range of 200-500 k$\Omega$. Similarly, for a strap length over 100 mm, the 0.1 wt % samples processed at 20° C. fall within the desired resistance range of 200-500 k$\Omega$. The samples which were magnetically stirred show a reduced resistance compared with the samples which were placed in a static bag.

The 0/90 weave in the core 2 not only provides the 0 degree axis required to conduct along the length of the core but the 90 degree fibres provide the network conduction that means there is no discrete path along the strap so if any 0 degree connection fails there is a path around it. This cross direction obviously means that there are parallel circuits but due to the low resistance of CNT-CNT connections and the number of them on a single fibre a single loss of connection is an immeasurable change unlike, for example, a copper resistance wire.

Tailoring of the resistance can be performed through the network density of the CNTs on the substrate through solution concentration or weave density of the tape/cloth substrate, or the width of the core 1 could simply be altered to increase or reduce the resistance per unit length. As the CNTs are not impregnated with polymer there is no risk of polymer swell with fuel affecting the conductive network.

If the bonding lead breaks, resulting in one of the halves making intermittent contact with the fuel tank wall, then the risk of sparking is mitigated by two factors:
the relatively high resistance of the bonding lead limits the current flow; and
the fact that the conductive core 2 is shielded along its length reduces the risk of intermittent contact compared with the case of an unshielded metal bonding lead.

Although the invention has been described above with reference to one or more preferred embodiments, it will be appreciated that various changes or modifications may be made without departing from the scope of the invention as defined in the appended claims.

The invention claimed is:

1. A bonding lead comprising a core; a sheath bonded to the core; and a conductive connector at each end of the bonding lead, wherein the core comprises a substrate of fibres coated with nano-objects with at least one dimension between 1 nm and 200 nm, wherein the nano-objects form a continuous electrically conductive network from one end of the bonding lead to the other with some of the nano-objects coating the fibres and others forming bridges between adjacent fibres, wherein the bonding lead has an electrical resistance between its two ends which is greater than 100 k$\Omega$.

2. The bonding lead of claim 1 wherein the fibres cross with each other.

3. The bonding lead of claim 2 wherein the nano-objects form bridges at the points where the fibres cross with each other.

4. The bonding lead of claim 1 wherein at least some of the fibres run continuously between the conductive connectors.

5. The bonding lead of claim 1 wherein the fibres are interlocked with each other, for instance by weaving, knitting, braiding or twisting.

6. The bonding lead of claim 1 wherein the fibres are coated with a surface activation material such as silane.

7. The bonding lead of claim 1 wherein the nano-objects are functionalized, for instance by carboxyl groups.

8. The bonding lead of claim 1 wherein the sheath is formed from a polymer with a conductive filler.

9. The bonding lead of claim 1 wherein each connector comprises a tab formed from an electrically conductive polymer.

10. The bonding lead of claim 1 wherein the bonding lead has an electrical resistance between its two ends which is greater than 200 k$\Omega$.

11. The bonding lead of claim 1 wherein the bonding lead has an electrical resistance between its two ends which is less than 10 M$\Omega$.

12. The bonding lead of claim 1 wherein the nano-objects are elongate nano-objects with an aspect ratio greater than 10.

13. The bonding lead of claim 1 wherein the nano-objects are carbon nano-objects.

14. The bonding lead of claim 1 wherein the sheath is fibre-reinforced.

15. The bonding lead of claim 1 wherein the conductive connector comprises a piece of conductive material which engages the core and/or the sheath.

16. A method of manufacturing the bonding lead of claim 1, the method comprising forming the core of the bonding lead by coating a substrate of fibres with nano-objects with at least one dimension between 1 nm and 200 nm so that the carbon nano-objects form a continuous electrically conductive network from one end of the bonding lead to the other, with some of the nano-objects coating the fibres and others forming bridges between adjacent fibres; bonding a sheath to the core; and attaching a conductive connector to each end of the bonding lead.

17. The method of claim 16 wherein the sheath is bonded to the core by at least partially impregnating a fibre substrate with a matrix; and curing the matrix in contact with the core.

18. The method of claim 16 wherein the fibres are coated with nano-objects by applying the nano-objects to the fibres as a liquid dispersion, and allowing the dispersion medium to evaporate.

19. The method of claim 16 wherein the fibres in the substrate cross with each other.

20. The method of claim 19 wherein the nano-objects form bridges at the points where the fibres cross with each other.

21. The method of claim 16 wherein at least some of the fibres run continuously between the conductive connectors.

22. A joint comprising: a first component; a second component joined to the first component; and a bonding lead according to claim 1 which forms an electrical connection between the components.

23. A fuel tank comprising the joint of claim 22.

24. An aircraft comprising a joint according to claim 22.

25. A method of preventing sparking across a joint on an aircraft, the method comprising:
    electrically connecting components of the joint with each other with a bonding lead according to claim 1;
    dissipating static charge between the components by means of the bonding lead; and
    passing lightning current between the components by means of the bonding lead.

26. An aircraft comprising a fuel tank according to claim 23.

27. The bonding lead of claim 1 wherein the bonding lead has an electrical resistance between its two ends which is less than 1 M$\Omega$.

28. The bonding lead of claim 1 wherein the nano-objects are elongate nano-objects with an aspect ratio greater than 100.

* * * * *